April 2, 1929. O. W. COWGILL 1,707,712
SLIDE BOX SHELL MACHINE
Filed Aug. 10, 1925 9 Sheets-Sheet 2

Inventor
O. W. Cowgill
By Cornwall, Credell & Janner
Attys

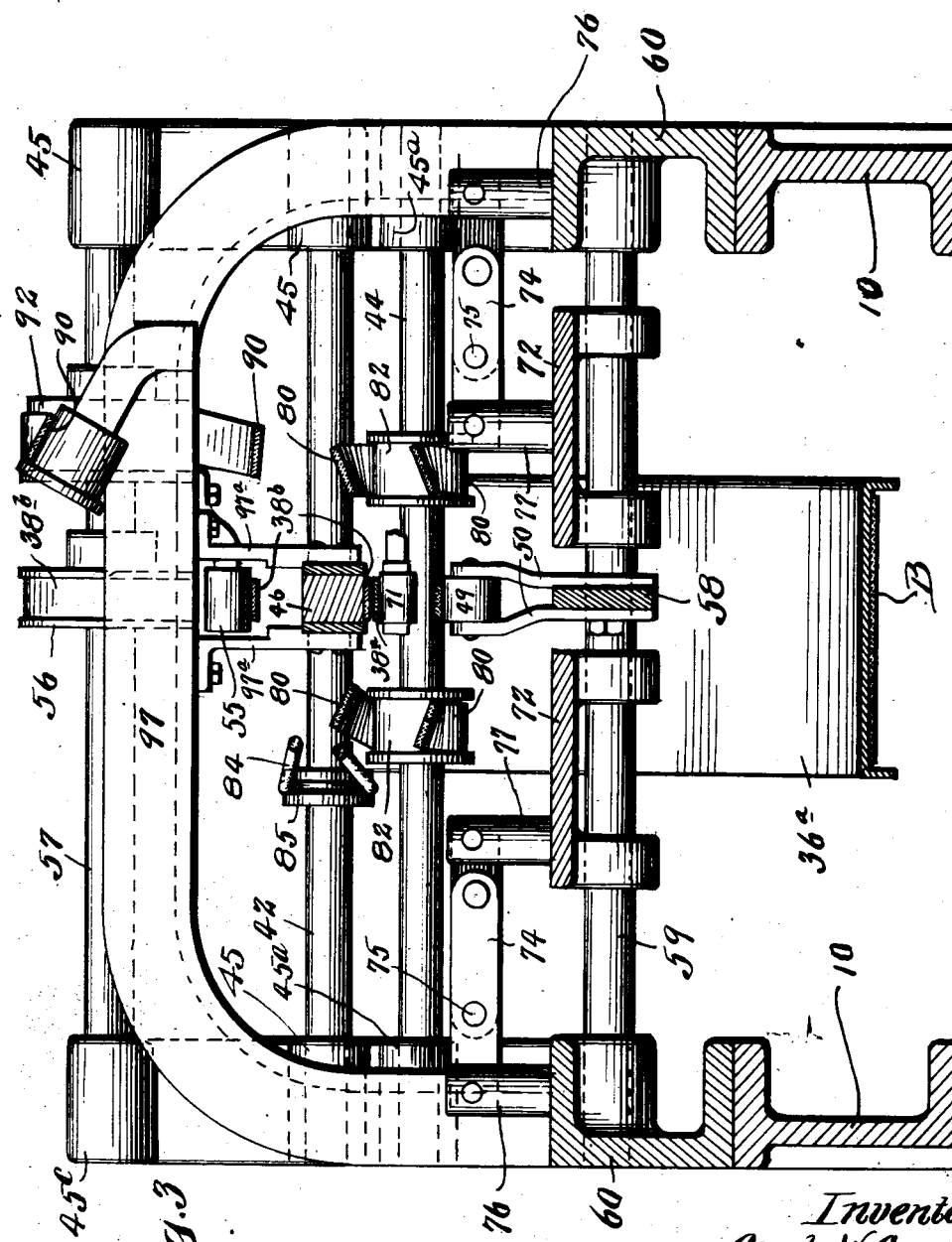

April 2, 1929.　　　O. W. COWGILL　　　1,707,712
SLIDE BOX SHELL MACHINE
Filed Aug. 10, 1925　　　9 Sheets-Sheet 4
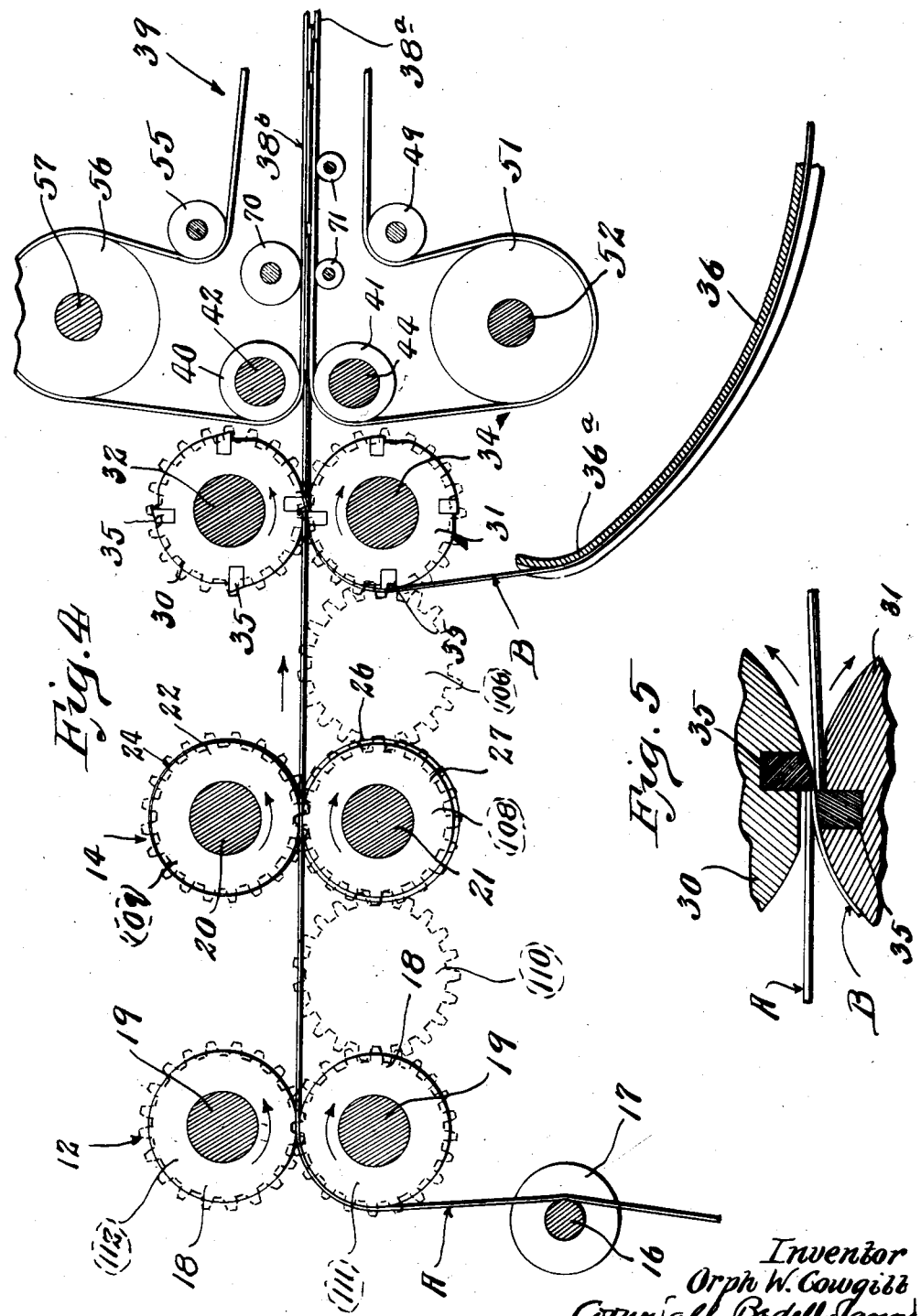
Inventor
Orph W. Cowgill
By Cornwall, Bedell, Janney
Attys.

April 2, 1929.  O. W. COWGILL  1,707,712
SLIDE BOX SHELL MACHINE
Filed Aug. 10, 1925   9 Sheets-Sheet 5
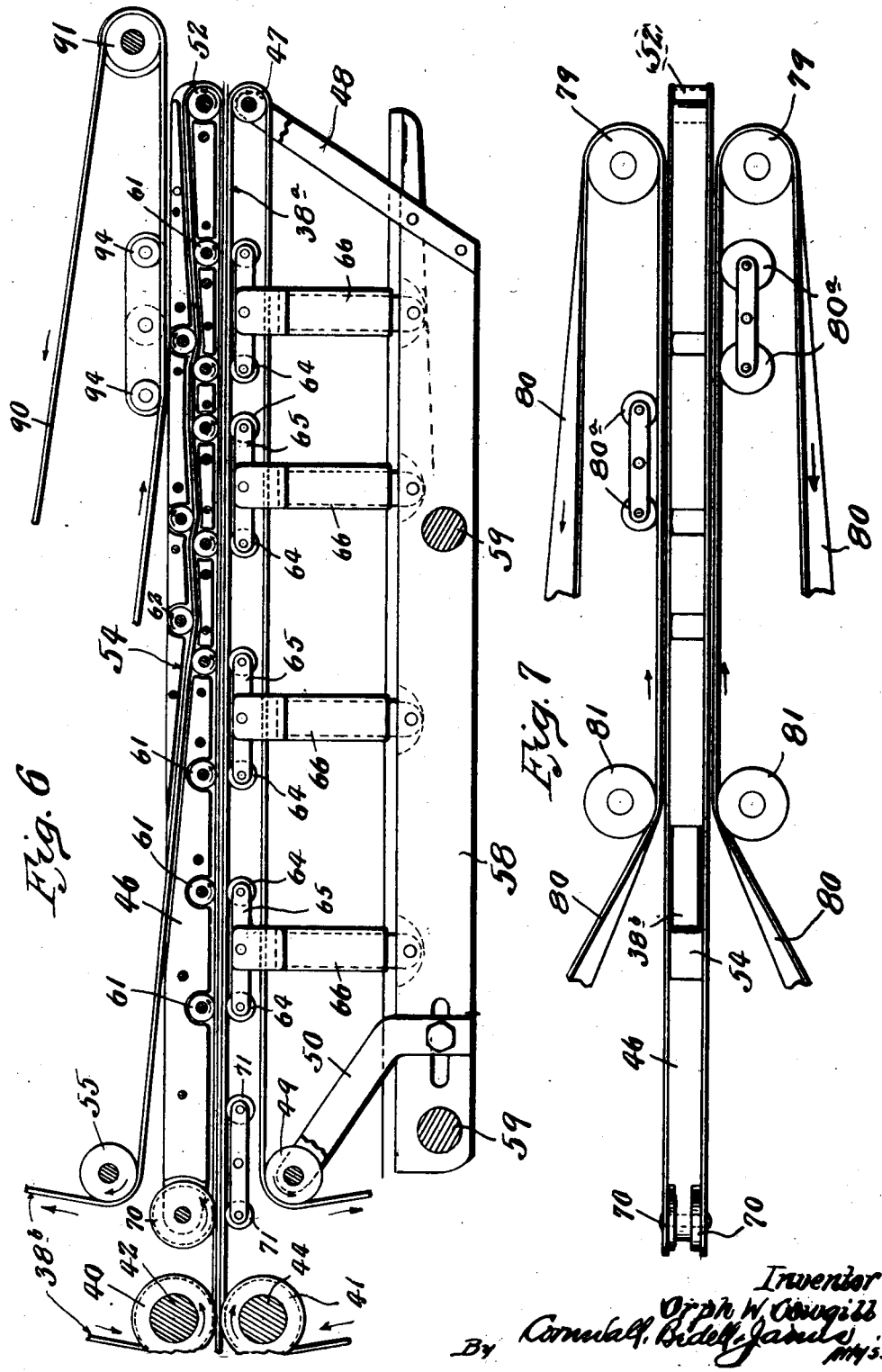

April 2, 1929.  O. W. COWGILL  1,707,712
SLIDE BOX SHELL MACHINE
Filed Aug. 10, 1925   9 Sheets-Sheet 6

Inventor
Orph W. Cowgill

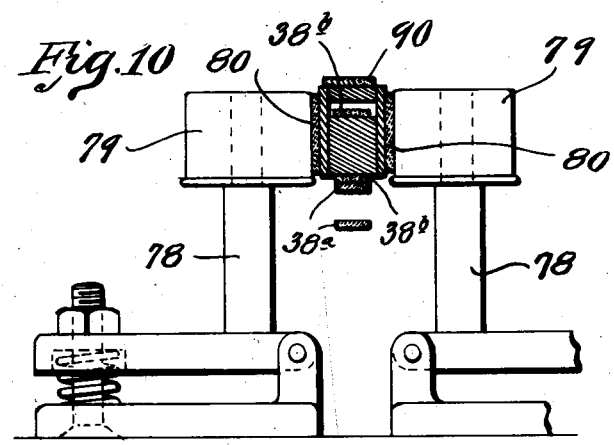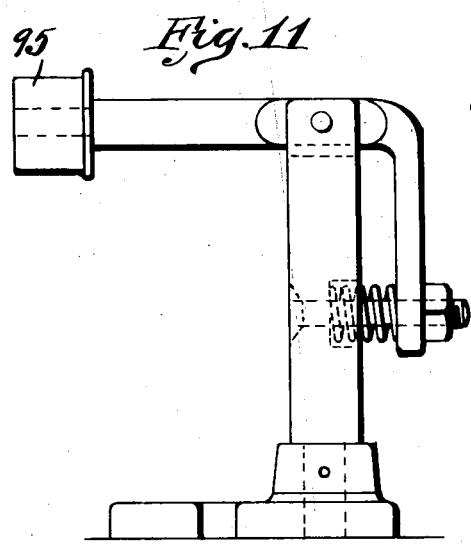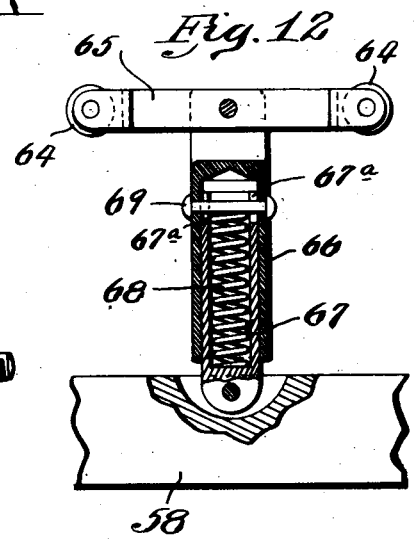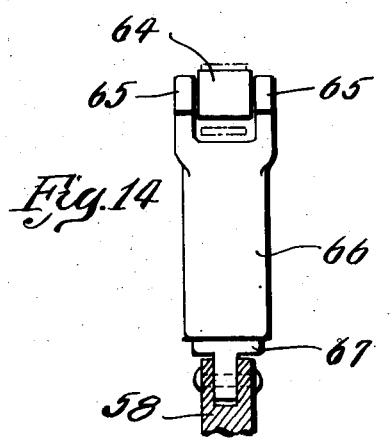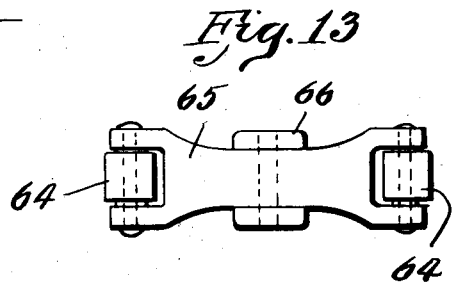

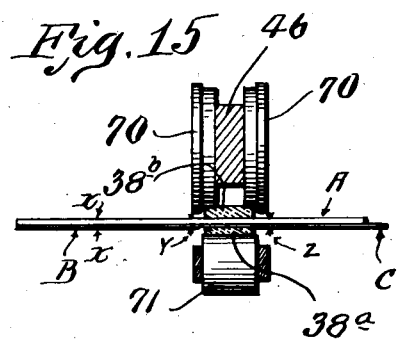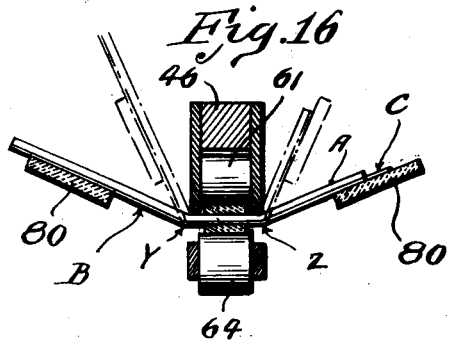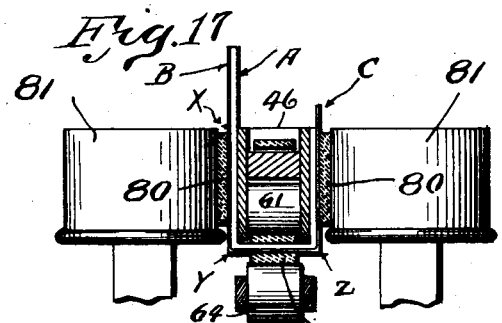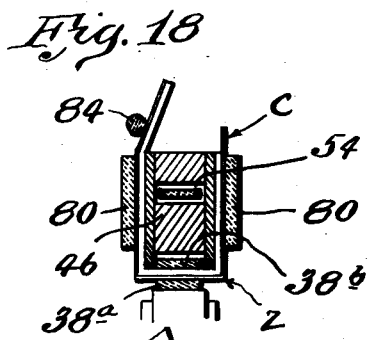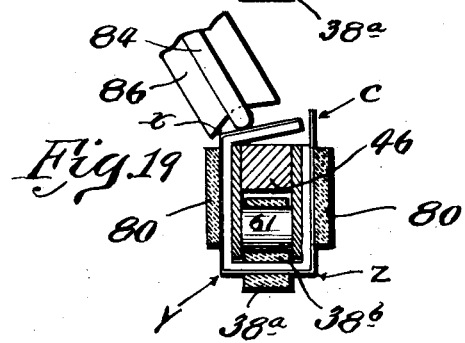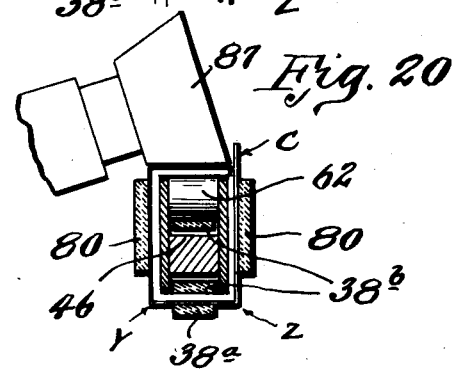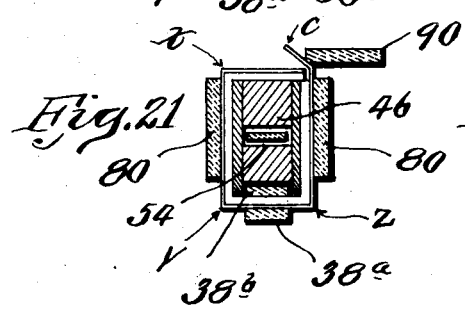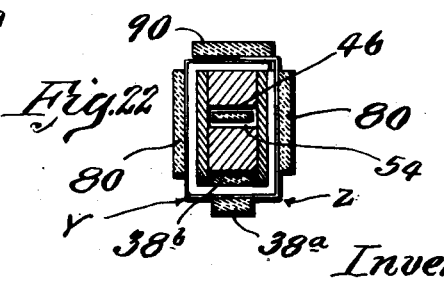

April 2, 1929. O. W. COWGILL 1,707,712
SLIDE BOX SHELL MACHINE
Filed Aug. 10, 1925 9 Sheets-Sheet 9

Inventor
Orph W. Cowgill
By Cornwall, Bidell & Janney
Attys.

Patented Apr. 2, 1929.

1,707,712

UNITED STATES PATENT OFFICE.

ORPH W. COWGILL, OF ST. LOUIS, MISSOURI, ASSIGNOR TO ST. LOUIS LABEL WORKS, OF ST. LOUIS, MISSOURI, A CORPORATION OF MISSOURI.

SLIDE-BOX-SHELL MACHINE.

Application filed August 10, 1925. Serial No. 49,416.

This invention relates to new and useful improvements in box making machines, the object being the provision of a machine for making the shells or outer members of pasteboard boxes of the slide type.

Further objects of the invention are to provide a machine of the type described which automatically cuts the shell blank, applies a covering of glazed or finishing material thereto, folds the blank in the proper form and ejects the completed shell and which machine can be operated at a suitable speed, thereby enabling the production of such slide shells on a commercial and profitable basis.

Further objects of the invention are to provide forming means operating successively on the various portions of said blanks in order to form said shell in accurate and efficient manner and to provide means for feeding blanks to said forming means in correlation with the operation thereof.

Still further objects of the invention are to provide suitable scoring and trimming mechanism for operating on a strip of pasteboard material and provide suitable mechanism for cutting said strip transversely into blanks of proper sizes and to provide suitable driving means for actuating the various units of the machine in correlation with each other.

Other objects of the invention are the provision of a machine of the class described for making slide-box shells in which the coverng or finishing material is flush to extension with the ends of the pasteboard material, thereby greatly enhancing the appearance of the completed article and increasing the strength thereof.

With these and other objects in view, my invention consists in certain novel features of construction and arrangement of parts hereinafter more fully described and claimed and illustrated in the accompanying drawings, in which—

Figure 3 is a vertical cross-section taken on the line 3—3 of Figure 2.

Figure 4 is a detail longitudinal cross-section of the machine, showing the feed rolls, the trimming and scoring mechanism and the blanking or cutting means.

Figure 5 is an enlarged detail view of the cutting or blanking means.

Figure 6 is a detail view of the mandrel and the forming mechanism cooperating therewith.

Figure 7 is a top plan view thereof partly broken away.

Figure 10 is a detail view showing the side pressure rollers of the forming mechanism.

Figure 11 is a detail view showing the belt tightener and guide for one of the endless conveyors of the forming mechanism.

Figure 12 is a vertical cross-section of the yielding support for the pressure rollers utilized in the forming mechanism.

Figure 13 is a top plan view thereof.

Figure 14 is an end elevational view of the same.

Figures 15 to 22 are detail views of the forming mechanism and illustrate the successive stages of the forming operation.

Figure 1:
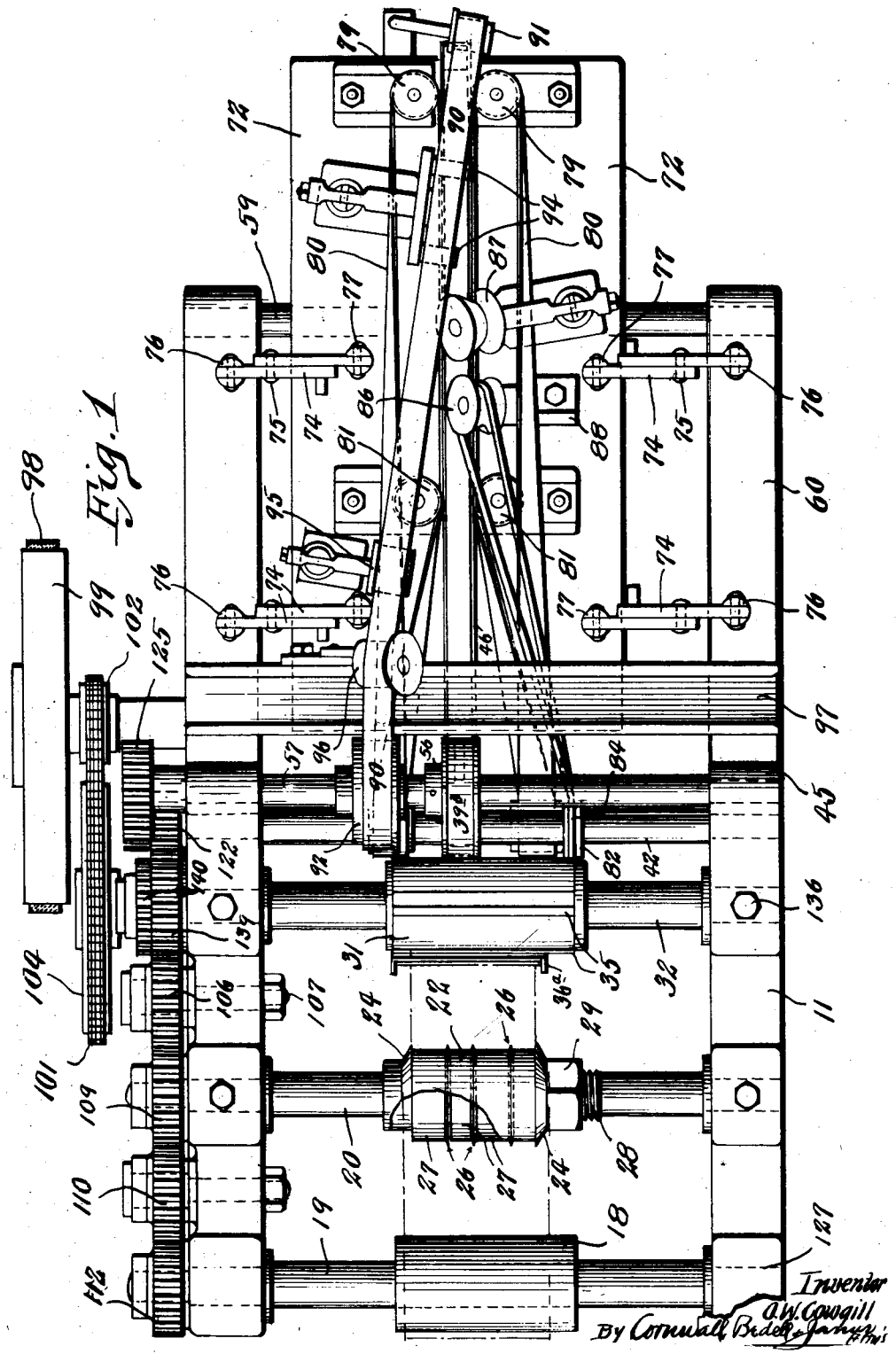
Figure 1 is a top plan view of the machine.

The machine disclosed in the present application is designed particularly for making shells or covers for pasteboard slide boxes. In the operation of the machine, a continuous strip of material is fed to suitable mechnism which trims the edges of the strip to the proper width and at the same time scores said strip longitudinally at the desired points. The strip is then fed to the blanking or cutting rolls and has applied to one face thereof the glue side of a strip of cover paper which forms the outer face of the finished shell. Immediately after the application of the covering material to said strip, the latter is cut transversely by said cutting rolls into blanks of suitable lengths. The severed blank is now engaged between two cooperating flat belts or endless conveyors traveling in the same direction away from the blanking mechanism. These belts pass under a stationary mandrel which is rectangular in cross-section and over which said blank is formed during its forward travel by means of belts and pressure rollers which in progressive stages engage the various portions of said blank and form it into proper shape. The length of the forming mechanism and the speed thereof is arranged so as to engage the various sides of the blank at proper intervals and allow the glue to set before the completed shell is discharged therefrom.

Referring by numerals to the accompanying drawings, 10 indicates a support carrying a pair of spaced side members 11 between which are arranged the feeding mechanism 12, the scoring and trimming mechanism 14 and the blanking mechanism 15. The material from which the slide shells are made is in the form of a roll R of pasteboard of the proper width supported rearwardly of the machine by a suitable support, not shown.

The strip A passes upwardly over a horizontally disposed rod 16, fixed to side members 10 and passes between spaced collars 17 which form a guide for said strip. From guide 16 this strip of material passes to the feed mechanism 12 consisting of a pair of rollers 18 carried by shafts 19 which are operated in the direction indicated by arrow and co-act to feed the strip forwardly to the scoring and trimming mechanism 14, which trims the edges of the strip to the proper width and scores said strip longitudinally at the appropriate points. This trimming and scoring mechanism comprises a pair of shafts 20 and 21 having their axes arranged in a vertical plane.

The upper shaft 20 has fixed thereto a sleeve 22 abutting the ends of which are cutting or trimming discs 24. The lower shaft 21 is provided with scoring discs 26 which are spaced from each other by means of collars 27. These collars 27 are of widths corresponding to the widths of the side walls of the shell so that the blank is trimmed to proper width and is scored to permit folding of the blank into a shell of the desired dimensions.

Shafts 20 and 21 are preferably threaded as indicated at 28 for receiving nuts 29 which hold the discs and the spacers in proper position on said shafts. By removing nuts 29, the discs and the spacers on said shafts can be changed to permit trimming and scoring of material for shells of other dimensions.

The scored and trimmed strip of material now passes between rolls 30 and 31 carried by shafts 32 and 34, respectively. These rolls have arranged on their peripheral faces longitudinally disposed blades 35 and the blades of the two rolls are adapted to coöperate with each other and cut the strip transversely into blanks of suitable lengths.

Previously to the cutting operation, however, the lower face of the strip A is brought into pressure contact with the glue face of a finishing strip of material B, which passes rearwardly and upwardly over a guide 36 and is engaged by the lower roll 31. Guide 36 is pivotally mounted in the machine at 37 and the rear end thereof $36^a$ is over-balanced so as to maintain the strip B yieldingly taut. The severed blank having passed between rolls 30 and 31 is engaged between two co-operating belts or conveyers $38^a$ and $38^b$ of a forming mechanism 39. These belts operate in the directions indicated by arrows and pass over pulleys 40 and 41, respectively, carried by shafts 42 and 44. Said shafts are journaled in bearings 45 and $45^a$ respectively attached to the forward ends of side members 11 and said shafts are arranged near shaft 32 and 34 in order to bring the point of contact of belt $38^a$ and $38^b$ in engagement with blank when severed by the cutting rolls 30 and 31.

Belts 38 extend forwardly and horizontally under the bottom of a mandrel or forming block 46 which is disposed forwardly of side members 11 and is spaced a suitable distance above support 10. The lower belt $38^a$ after traversing the full length of the mandrel 46 passes over a pulley 47 carried by an arm 48 and extends rearwardly and operates over a pulley 49 carried by an arm 50. After passing over pulley 49, belt $38^a$ is diverted downwardly and passes over a comparatively large pulley 51 which is carried by a shaft 52, the ends of which are journaled in bearings $45^b$. From pulley 51 belt $38^a$ extends upwardly and returns to pulley 41. The upper belt $38^b$ after passing under the mandrel 46 is engaged by a pulley 52 which is journaled in the forward end of mandrel 46 and said belt is then returned rearwardly through slot 54 formed in said mandrel 46 which slot extends rearwardly and terminates in the upper face of said mandrel at a point near the rear end thereof. After leaving the mandrel, belt $38^b$ operates under a pulley 55 and then extends upwardly and operates over a comparatively large pulley 56 carried by a shaft 57, the ends of which are journaled in the upper ends of the bearings $45^c$. After passing over pulley 56, belt $38^b$ returns to pulley 40 in cooperative relation with belt $38^a$.

Figure 2:
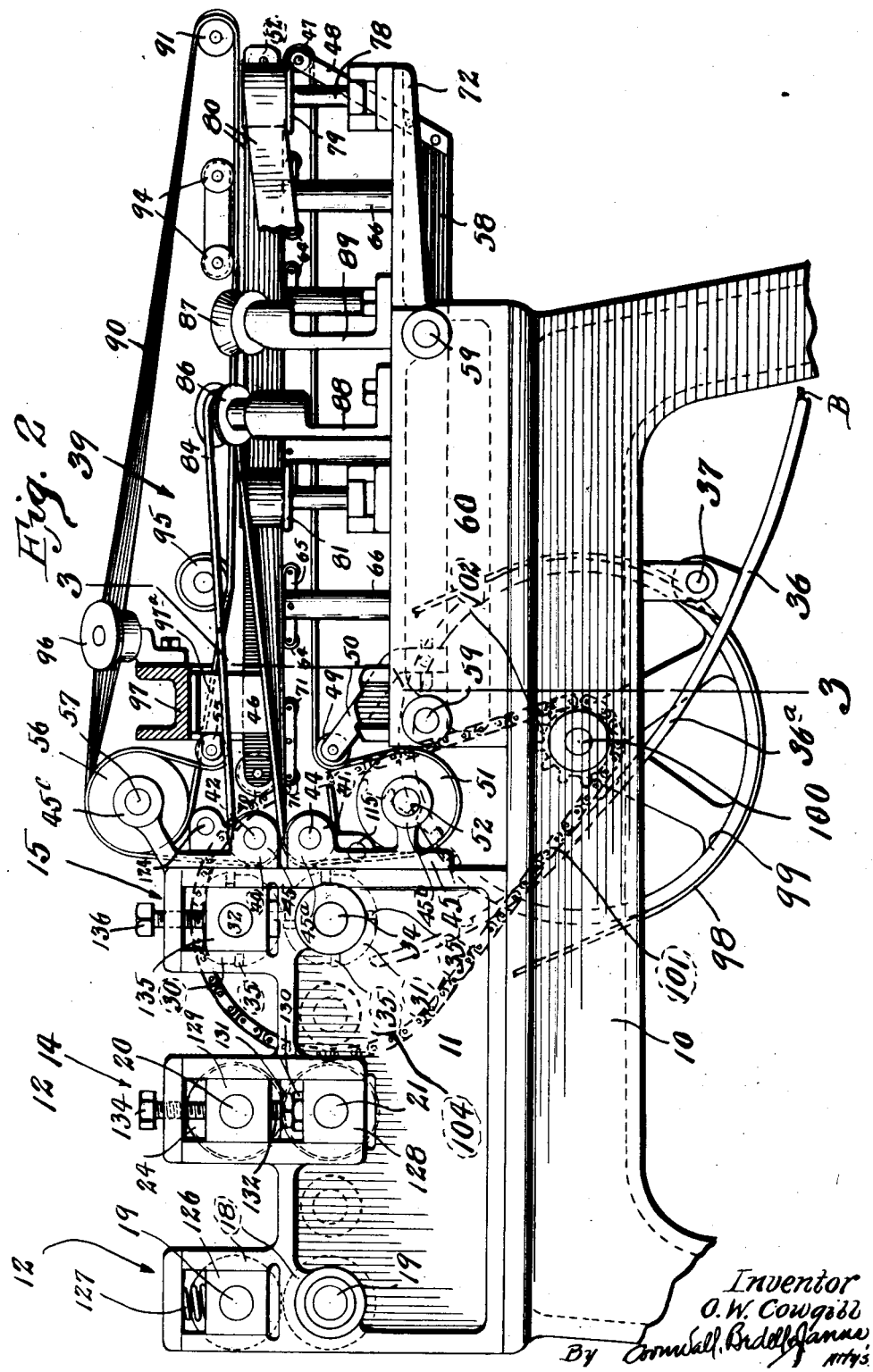
Figure 2 is a side elevational view thereof.

Belts $38^a$ and $38^b$ are utilized for engaging a blank and carrying it forward through the forming mechanism in close relation with mandrel 46 over which said blank is formed. In order to maintain said belts in taut relation rolls 49 and 55 are adjustable so as to remove any slack from said belts. Roll 49 is adjustable by means of arm 50, the lower end of which is secured to a longitudinally disposed bar 58 which is supported below the mandrel and preferably in vertical alignment therewith by horizontally disposed transverse members 59, the ends of which are supported in side members 60 which latter rest on supports 10 and are disposed forwardly of the side members 11, as shown in Figure 2.

Arm 48 carrying roll 47 is fixed to the forward end of bar 58 and arm 50 is adjustable in the rear end thereof so as to regulate the tension of said belt 38ª. The upper belt 38ᵇ in passing under mandrel 46 operates under a series of rollers 61 which are journaled in suitable recesses formed in the underside of said mandrel and forming anti-friction points of contact between said mandrel and said belt 38ᵇ. Similarly, a series of rollers 62 is disposed in the upper portion of said mandrel for engaging with the portion of the belt which passes through the slot in said mandrel. Rollers 62 project above the upper face of mandrel 46 and form anti-friction bearings for the blank portion folded thereagainst and traveling thereon.

In order to maintain a sufficient degree of pressure between said belts so as to securely hold the blank in position during its travel through the forming mechanism, a series of rollers 64 is adapted to engage the underside of belt 38ª and exert yielding pressure thereagainst. Rollers 64 are preferably arranged in vertical planes to the axes of rollers 61, as shown in Figure 6, and are arranged in pairs mounted in arms 65, each of which is pivotally supported in the upper bifurcated end of a sleeve 66, which slidably operates over a hollow tubular member 67, the lower end of which is secured to bar 58. A coil spring 68 (Figure 12) is disposed in each tubular member 67 and bears against a pin 69 which is secured to and extends diametrically through the upper end of each sleeve 66, thereby transmitting spring pressure to rollers 64. Pin 69 traverses slots 67ª formed in the upper end of tubular member 67. In this manner, sleeve 66 is held against rotation on tubular member 67 and thereby maintains arm 65 and the rollers carried thereby in accurate alignment with the belts and mandrel.

The extreme rear end of member 46 carries flanged rolls 70 which form guides for the upper belt 38ᵇ and an auxiliary pair of rollers 71 yieldingly bears against the underside of the lower belt 38ª so as to maintain said belts in proper relation with guide rolls 70. Rolls 71 are carried by a spring pressed support 71ª which tends to hold said rolls yieldingly against the underside of belt 38ª. Arms 65 being pivotally mounted permit automatic adjustment of rollers 64 to the contour of the belt.

Slidably arranged on members 59 are horizontally disposed tables 72 (Figure 1) which are arranged between side member 60 and the centrally disposed bar 58. These tables are movable inwardly toward bar 58 into operating positions and outwardly toward side member 60 into inoperative positions by means of toggle mechanism 74, each of which comprises two links pivotally connected together at 75 and having their outer ends pivotally connected to posts 76 and 77, respectively. Posts 76 are fixed to side members 60 and posts 77 are fixed to tables 72 so that by operating said toggle connections 74, tables 72 can be moved inwardly or outwardly, as desired.

Supported on the forward end of each table 72 by a suitable arm 78 is a vertically disposed pulley 79 over which operates an endless belt 80. Pulleys 79 are disposed to each side of mandrel 46 and in close relation therewith so that the belts 80 operating over said pulleys are brought into close contact with the sides of said mandrel. A pair of pulleys 81 (Figure 7) are spaced a suitable distance from pulley 79 and are also arranged in close relation with mandrel 46 so as to maintain those portions of belts 80 extending between said pulleys substantially in parallelism with the sides of said mandrel. Belts 80 are driven by pulleys 82 which are fixed to the horizontally disposed shaft 44, said pulleys being spaced a suitable distance to each side of pulley 41. After passing over pulley 79, the belts return to pulleys 82. Pulleys 82 being disposed horizontally, those portions of belt 80 extending between pulleys 82 and pulleys 81 are gradually inclined from horizontal to vertical positions and are therefore adapted to engage the horizontally projecting portions of the blank and gradually bring said projecting portions into vertical positions against the sides of mandrel 46, as shown in Figures 16 and 17. Thus the two parallel sides of the blank are maintained in this position under pressure by the vertically disposed portions of the belts 80 during the travel of said belts between pulleys 81 and 79.

A round belt 84 operates over a pulley 85 fixed to shaft 42 (Figure 3) and disposed to the right side of the mandrel. This belt extends forwardly and operates over a pulley 86 which is arranged a slight distance forwardly of the corresponding pulleys 81 and is angularly disposed above mandrel 46, as shown in Figure 19. Belt 84 in passing over pulley 86 engages the projecting portion of the blank, as shown in Figure 18, and brings said portion downwardly against the upper face of said mandred as shown in Figure 19. Immediately after said portion has been bent downwardly, it is engaged by a pressure roller 87 which completes the bending or forming operation of the projecting portion of said blank.

Belt pulley 86 is supported in a member 88 which is fixed to or projects upwardly from table 72 and pressure roller 87 is carried by a support 89 (Figure 2) also fixed to table 72.

Figure 23:
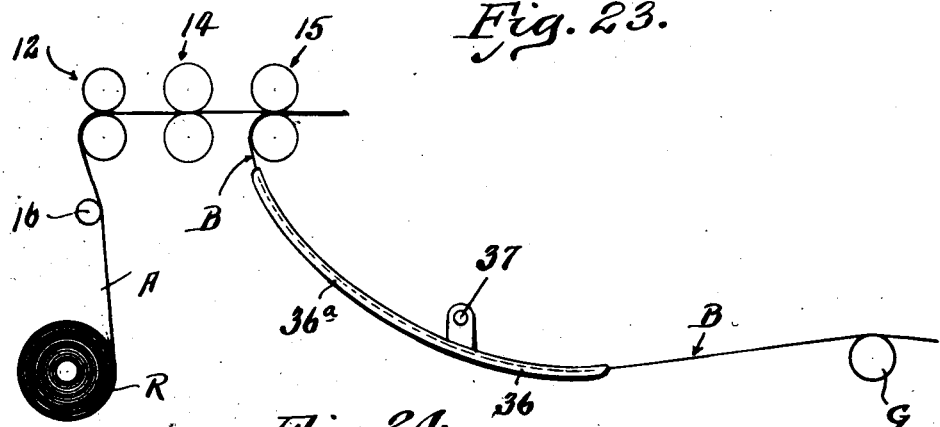
Figure 23 illustrates diagrammatically the disposition of the strip of pasteboard material and the strip of finishing material.
Figure 24:
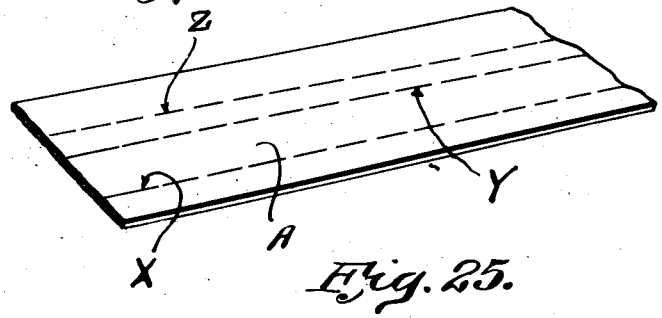
Figure 24 is a perspective detail view of a portion of pasteboard material trimmed and scored longitudinally.
Figure 25:
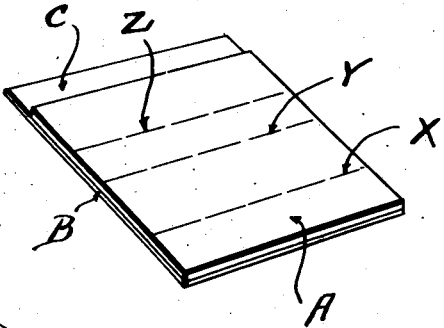
Figure 25 is a perspective detail view of a severed or blank portion of the strip with the finishing or cover material applied to one face thereof.
Figure 26:
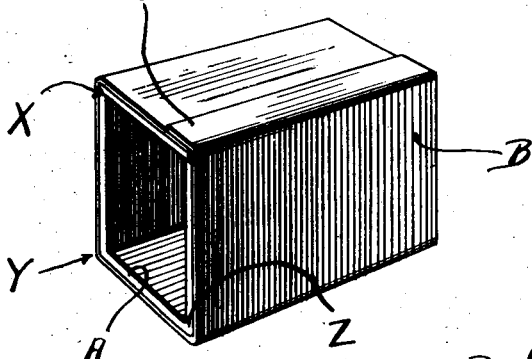
Figure 26 is a perspective detail view of a finished slide box shell.

The blank from which the shell is made comprises a section of pasteboard material A to one face of which is applied a piece of finishing material B, as shown in Figures 23 and 25. The width of this material is slightly greater than the width of the blank, thereby leaving to one side of said section A, preferably the left side, an exposed or unattached portion C of said finishing material. The blank is scored at points $x$, $y$, $z$, in order to permit accurate forming of the shell. When the blank is initially engaged by belts 80, said blank is bent at points $y$ and $z$. When the projecting portion of the blank is engaged by round belt 84, said blank is bent at point $x$. After the blank has received its final forming operation by the roller 87, the projecting or unattached portion C of the finishing strip B is brought downwardly against the upper portion of the blank, as shown in Figures 21 and 22, thereby securing together the edges of the folded blank. This folding operation of portion C is accomplished by a flat belt 90 which operates over a pulley 91 arranged above and past the forward end of mandrel 46 and operating over a pulley 92 fixed to shaft 57. Belt 90 is disposed at an angle to the longitudinal axis of the machine and mandrel 46 so that said belt is brought into gradual engagement with the projecting portion C, as shown in Figures 21 and 22, and has a side wiping action on said portion thereby effecting an efficient seal and preventing buckling of said portion.

A pair of pressure rollers 94 (Figure 6) bears on belt 90 and increases the pressure with which said belt is applied to the projecting portions C and a pulley 95 (Figures 1 and 2) is used for bringing said belt in proper relation with the mandrel and the blanks arranged thereon. A pulley 96 engages the upper portions of belt 90 for providing guiding alignment to pulley 92 and the proper clearance between said belt and an arched transverse frame member 97 which straddles mandrel 46 and has its ends connected to side frames 60. Member 97 forms a support for pulley 96 and pulley 55 and connects members 60. A pair of brackets 97$^a$ depends from member 97 and the lower ends of said brackets are attached to and support mandrel 46, as shown in Figure 3. A pair of side pressure rollers 80$^a$ is disposed on each side of the mandrel near the discharging end thereof and serve to yieldingly hold belts 80 in close relation with the sides of said mandrel.

Figure 8:
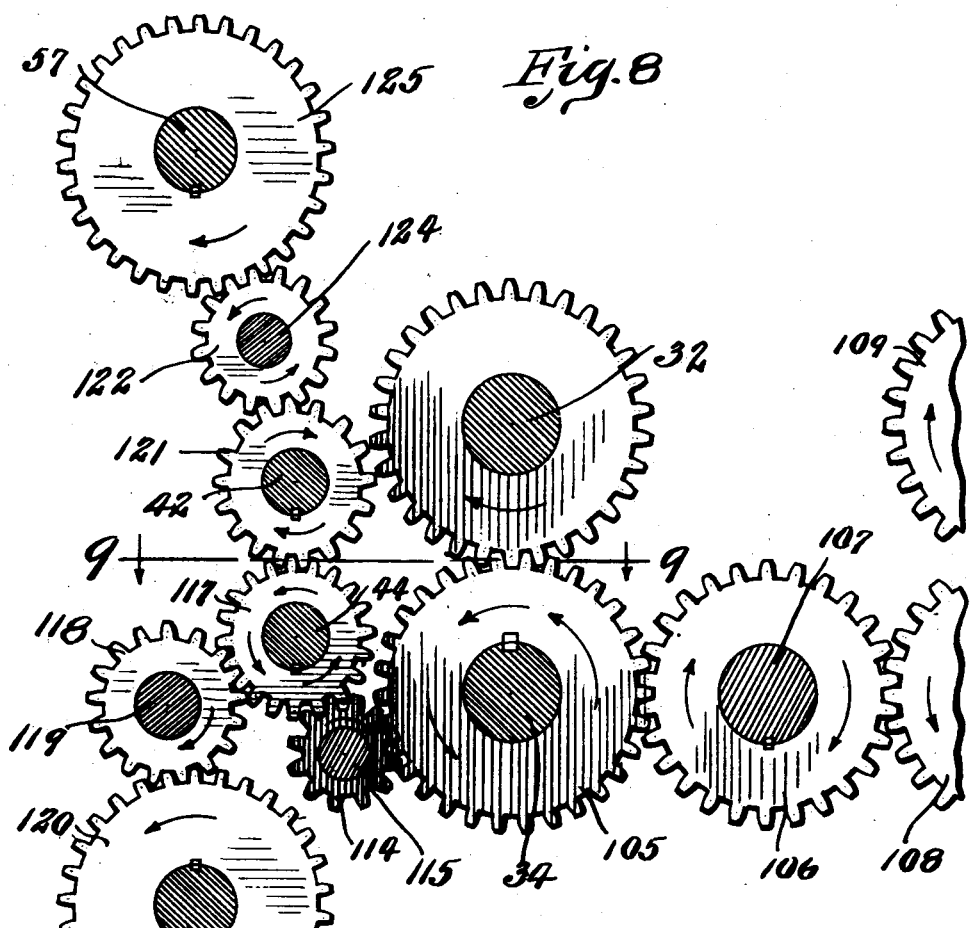
Figure 8 is a detail view showing the driving connections of the machine.

The machine is operated by means of a belt 98 which operates over pulley 99 fixed to shaft 100. A chain 101 operates over a sprocket wheel 102 fixed to said shaft and over wheel 104 fixed to shaft 34 thereby actuating said shaft. A gear 105 (Figure 8) is keyed to shaft 34 and meshing with said gear is an idler 106 carried by a stud 107 which in turn meshes with a gear 108 fixed to shaft 21. Meshing with gear 108 is a gear 109 carried by a shaft 20 whereby the scoring and trimming mechanism 14 is driven at uniform speed with the blanking mechanism 15.

Meshing with gear 108 is an idler gear 110. Meshing with the latter is a gear 111 carried by the lower shaft 19 which meshes with a gear 112 of the upper shaft 19, thereby actuating said food rollers 18.

Figure 9:
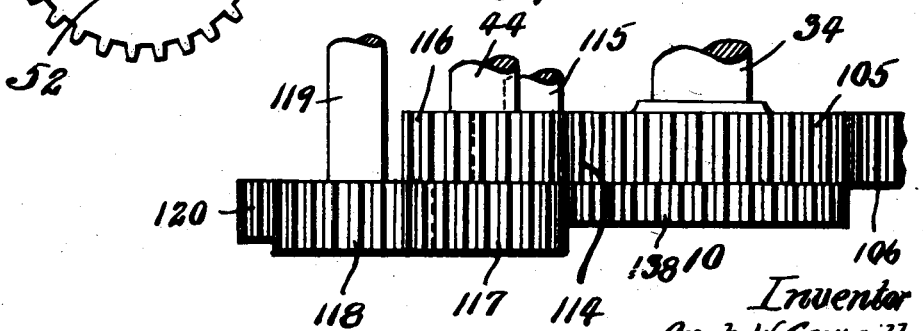
Figure 9 is a horizontal cross-section taken on the line 9—9 of Figure 8.

The driving connections for shafts of the various pulleys consist of an idler 114 (Figure 8) mounted on a stud shaft 115 which idler meshes with gear 105. Meshing with this idle gear 114 is a gear 116 (Fig. 9) fixed to shaft 44. Adjoining said gear 116 and fixed on shaft 44 is a gear 117 meshing with an idle gear 118 mounted on a stud shaft 119. A comparatively large gear 120 is fixed to shaft 52 and meshes with idle gear 118, thereby driving pulley 51 in the direction indicated by arrow. Meshing with gear 117 is a gear 121 (Figure 8) fixed to the shaft 42 and idle gear 122 is mounted on a stud shaft 124 and meshes with said gear 121 and with a comparatively large gear 125 fixed to shaft 57 and on which shaft are arranged pulley 56, belt 38$^b$ and pulley 92 operating belt 90. In this manner, the respective shafts derive their motion from gear 105 through idle gear 114 and gear 116 and said shafts are operated at a slightly greater speed than the shafts of the feeding, scoring and blanking mechanism in order to space from each other the blanks engaged by belts 38$^a$ and 38$^b$ so as to provide suitable clearance therebetween during the forming operation thereof. This increase in speed is accomplished by increasing the circumference of gear 117 with respect to gear 116. This difference in circumference of the two gears provides a higher rate of speed for the forming mechanism and thereby spaces the blanks from each other a suitable distance apart.

The lower one of shafts 19 (Figure 2) has a fixed bearing in side frames 11 while the upper one of the shafts 19 has a bearing in spring pressed blocks 126. This spring pressure supplied by a coiled spring 127 exerts a grip through shafts 19 and rolls 18 to the pasteboard, whereby the latter can be fed in an efficient manner. Shaft 21 of the mechanism 14 has the bearings in blocks 128 which occupy fixed positions in side members 11, while the shaft 20 has bearings in blocks 129 which are adjustable in vertical plane relative to blocks 128. This adjustment is accomplished by means of nut 130, a nut lock 131, which bear on stationary blocks 128 and are threaded on a bolt 132 which latter is fixed to adjustable blocks 129.

A screw 134 is interposed between the upper end of each block 129 and the top of the bearing in which said block is mounted, thereby maintaining the upper roller of the scoring and trimming mechanism in proper relation with the scoring discs carried by the lower shaft. The screws 132 and 134 and the nuts 130 and 131 provide for adjustment for regulatitng the depth of the score. The lower shaft 34 is journaled in fixed bearings in side frames 11 and the upper shaft 32 is journaled in bearing blocks 135 which are adjustable in their supports in vertical plane. A screw 136 is screw seated in the top wall of the bearing support and bears on the respective block 135 for maintaining the upper shaft 32 and the cutting blades carried thereby in proper relation with the cutting blades carried by the lower shaft.

Strip B before coming in engagement with guide 36 has applied to its lower face by means of a glue roller G suitable adhesive. This has a tendency to curl the strips longitudinally. In order to prevent this curling effect, guide 36 is curved in a longitudinal direction, thereby placing a certain amount of stress on the strip causing it to lie snugly against said guide, thereby eliminating curling of said strip and delivering it to the strip of pasteboard in proper form.

In the operation of the machine, the strip of pasteboard A, after being properly trimmed and scored, passes between rolls to receive a strip of covering material B which is applied to one face thereof by the lower roll 34. The two strips are now cut transversely by the cutting blades and the severed piece is engaged by the conveying means for passage through the forming mechanism. The severing of the pasteboard strip A, after the covering strip B has been attached thereto, insures the production of shells having the covering paper terminating flush with the ends of the shell, instead of leaving the end portions of the pasteboard material exposed as has been generaly done heretofore.

The manufacture of shells having covering material to extension with the ends of the pasteboard material, adds to the appearance of the box and reinforces the shell.

The blank in passing through the forming mechanism is operated in successive stages, the side portions being first formed by side forming members 80 and then the top or horizontal portion being formed by belt 84 and presser roll 87, after which the projecting portion C of the covering material is bent in place by member 90 to secure the edges of the formed blank together to retain the shell in proper shape. After leaving the forming mechanism, the completed shell is dropped or discharged from the machine.

My improved machine is designed to operate in an efficient manner to produce shells which are of correct form and of strong construction.

In the operation of my machine, the wastage of material is reduced to a minimum and the articles are produced quickly and economically.

While I have shown and described the preferred form of my invention, it is obvious that various changes in the construction and arrangement of parts can be made in the construction of my machine, without departing from the spirit of my invention.

I claim:

1. A machine of the class described comprising a scoring and trimming mechanism adapted to operate upon a strip of pasteboard, mechanism for receiving said strip and adapted to apply thereto a strip of finishing material and cut the finished strip transversely into suitable lengths, a pair of endless conveyors for receiving said severed blanks, a stationary mandrel arranged in cooperative relation with said conveyors, an endless belt arranged on each side of said mandrel for progressively folding the side portions of said blank against the sides of said mandrel and means for engaging the top portion of said blank and folding it against the top of said mandrel.

2. A machine of the class described comprising a scoring and trimming means adapted to score longitudinally a strip of pasteboard material and trim the edges thereof, mechanism for applying to one face of said strip a finishing material and cutting said composite strip transversely into blanks of predetermined lengths, a stationary mandrel, a pair of endless belts for receiving said blanks and moving them into cooperative relation with said mandrel, an endless belt arranged on each side of said mandrel for progressively folding the side portions of said blank against the sides of said mandrel, means for mounting said belts and operating them in correlation with each other, and means for engaging the end portion of said blank and folding it against said mandrel at right angles to said side portions.

3. A machine of the class described comprising a scoring and trimming mechanism adapted to score a strip of pasteboard material longitudinally and trim the edges thereof, mechanism for engaging said strip and applying to one face thereof the glue face of a finishing strip of material, the width of said finishing strip being greater than the width of the pasteboard strip whereby one side of said finishing strip projects beyond the edge of said pasteboard strip, means for cutting the two strips transversely into blanks of suitable lengths, endless conveyors for receiving the severed blanks, means for engaging and folding portions of said blank, and means for engaging the overlapping portion of said finishing strip and applying it to the opposite edge of said blank.

4. A machine of the class described comprising cooperating rollers adapted to receive a strip of scored pasteboard and applying to one face thereof a strip of finishing material with one edge of said finishing strip projecting beyond one edge of said pasteboard strip, means on said rollers for cutting the composite strips transversely into blanks of predetermined lengths, a pair of endless belts in cooperative relation to each other for engaging and carrying forward the severed blanks, means for engaging said blanks and folding them into rectangular shapes, and means for applying the overlapping edge of said finishing strip to the composite edge of the formed blank.

5. A machine of the class described comprising means for applying the glue face of a strip of finishing material to the underside of a strip of pasteboard and severing such composite strip transversely into blanks of suitable lengths, one edge of said finishing strip extending beyond the corresponding edge of said pasteboard strip a pair of cooperating endless conveyors adapted to receive said blanks and move them forward, driving connections for uniting said conveyors and a series of forming members adapted to progressively operate upon the various portions of each blank and fold the latter into proper form and applying the overlapping portion of said finishing strip to the opposite edge of said blank.

6. A machine of the class described comprising, in combination, means for applying the glue face of a strip of finishing material to the scored face of a strip of pasteboard and then severing said pasteboard strip transversely into suitable lengths, said strip of finishing material being of greater width than the strip of pasteboard whereby one edge of said finishing strip projects past the corresponding edge of said pasteboard strip, a pair of cooperating belt conveyors adapted to receive the severed pieces and move them in one direction, a series of forming members adapted to progressively operate upon the various portions of said pasteboard strip and fold it in proper shape, and means for engaging the projecting portion of the finishing strip and applying it to the opposite edge of said pasteboard.

7. A machine of the class described comprising in combination means for applying the glue face of a strip of finishing material to the scored face of a strip of pasteboard and then severing said pasteboard strip transversely into suitable lengths, said strip of finishing material being of greater width than the strip of pasteboard whereby one edge of said finishing strip projects past the corresponding edge of said pasteboard strip, a pair of cooperating belt conveyors adapted to receive the severed pieces and move them in one direction, a series of forming members adapted to progressively operate upon the various portions of said pasteboard strip and fold it in proper shape, and a belt for engaging the projecting portion of the finishing strip and applying it to the opposite edge of the folded blank.

8. A machine of the class described comprising scoring mechanism, a mechanism for applying the glue side of a finishing strip of material to a strip of pasteboard, means for severing the pasteboard strip transversely into blanks of suitable lengths, cooperating belt conveyors for engaging and moving forward said blanks, a stationary mandrel in cooperative relation with said belt conveyors, a pair of belts operating longitudinally of and to each side of said mandrel and of said conveyors for engaging and folding certain portions of each blank against the sides of said mandrel, means progressively for engaging and folding the remaining portion of said blank against the top of said mandrel, and driving connections for operating said conveyor belts and said forming belts and means at a comparatively greater rate of speed with respect to said severing mechanism.

9. A machine of the class described comprising a pair of co-acting rollers for applying a strip of finishing material to a strip of pasteboard, the width of said finishing material being greater than the width of said pasteboard thereby leaving a portion of said finishing material projecting past one edge of said pasteboard material, means on said rollers for severing said strip of pasteboard transversely into blanks, a stationary mandrel, cooperating belt conveyors for engaging the severed blanks and moving them longitudinally of said mandrel, a pair of forming belts disposed to each side of said mandrel for engaging and folding said portions of each blank thereagainst, means operating adjacent to the top of said mandrel for engaging and folding certain other portions of said blank thereagainst, and means for folding the projecting portion of said finishing strip over the adjoining edge of said folded blank.

10. A machine of the class described comprising a feed mechanism for feeding a strip of pasteboard in one direction, scoring and trimming mechanism for scoring and trimming said strip to proper width, a pair of coacting rolls for receiving said pasteboard strip and applying thereto a strip of finishing material, the width of which is greater than the width of said pasteboard strip thereby leaving one edge of said finishing strip exposed, cutting blades longitudinally disposed on said coacting rolls and cooperating with each other for severing said strips transversely, conveying means operating adjacent to said coacting rolls for carrying the severed blanks forward, a stationary elongated mandrel disposed in cooperative relation with said conveying means, a pair of forming belts disposed to each side of said mandrel for engaging certain portions of said blank and folding them against the sides of said mandrel, means for engaging a portion of said blank and folding it against the top of said mandrel, and a member operating above said mandrel and at an angle to the longitudinal axis thereof for engaging the projecting portion of said finishing strip and applying it to the edge of the folded blank.

11. A forming mechanism comprising a stationary mandrel, a pair of cooperating belt conveyors adapted to engage a blank of suitable material and carrying it forward in engagement with the underside of said mandrel, forming belts disposed to each side of said mandrel for engaging portions of said blanks and folding them against the respective sides of said mandrel, an endless belt arranged above and at an angle to said mandrel for engaging and gradually bending a portion of said blank over the top of said mandrel, and means for securing the edges of the folded blank together.

12. A forming mechanism comprising a stationary mandrel, a pair of cooperating belt conveyors adapted to receive a blank of pasteboard material and move it into cooperative relation with the underside of said mandrel, a forming belt disposed to each side of said mandrel for engaging certain portions of said blank and folding them against the respective sides of said mandrel, means for maintaining said forming belts in operative yielding relation with said mandrel, means including a belt and a roller disposed above said mandrel for engaging and gradually folding certain other portion of said blank against the top of said mandrel, and means for securing the edges of the folded blank together while engaged by said conveyors and said belts.

13. A forming mechanism comprising a stationary mandrel, a pair of cooperating belt conveyors adapted to engage a blank of pasteboard material and move it forward into cooperative relation with said mandrel, a forming belt operatively disposed on each side of said mandrel for bending portions of said blank against the respective sides of said mandrel, a belt operatively disposed above said mandrel for engaging certain other portions of said blank and bending it against the top of said mandrel, a pressure roller for engaging the last mentioned portion and applying it under pressure to said mandrel to bring the side edges of the blank in close relation to each other, and means for applying a projecting glue portion of a strip secured to one edge of said blank to the other edge thereof for permanently securing the said edges together.

14. A forming mechanism comprising an elongated stationary mandrel rectangular in cross-section, a pair of cooperating endless conveyors adapted to engage a blank of pasteboard material and move it forward in cooperative relation with said mandrel, a pair of forming belts operatively disposed to each side of said mandrel adapted to engage the projecting portions of said blank and fold it against the sides of said mandrel, means engaging said forming belts for maintaining them under spring pressure against the sides of said mandrel, a belt operating above said mandrel for gradually engaging certain portions of said blank and folding it against the top of said mandrel, a pressure roller for applying the last mentioned portion under pressure to said mandrel to bring the edges of the folded blank in close relation to each other, and a belt operating above the forward end of said mandrel for folding a projecting loose strip carried by one edge of said blank against the opposite edge thereby securing said blank in its folded form.

15. In a forming mechanism, a stationary elongated mandrel rectangular in cross-section, a pair of belt conveyors in cooperative relation with each other adapted to receive blanks of pasteboard material and carry them forward in cooperative relation with the underside of said mandrel, a series of rollers transversely journaled in said mandrel for engaging one of said belt conveyors to provide anti-friction bearing therefor, a series of rollers supported under said mandrel for engaging the other one of said belt conveyors to maintain both of said belt conveyors in close relation with each other and with said mandrel, a pair of forming belts operatively disposed to each side of said mandrel for engaging portions of said blank and folding them against the sides of said mandrel, means for maintaining said side forming belts in close relation with the sides of said mandrel, means for forming certain other portions of the said blank and applying it against the top of said mandrel, a folding belt operatively disposed above said mandrel for engaging a projecting portion of a finishing strip secured to one edge of said blank and applying said projectng portion against the folded opposite edge of said blank, and pressure rollers engaging said folding belt for maintaining it under pressure contact with said blank and said mandrel.

16. In a forming mechanism, the combination with a belt conveyor, of a stationary mandrel rectangular in cross-section, a series of rollers transversely journaled in recesses formed in the underside of said mandrel for forming anti-friction bearing for said belt while traveling under said mandrel, a roller journaled in the forward end of said mandrel over which said belt operates, said mandrel being provided with a longitudinally disposed slot through which said belt operates during its return movement, a series of rollers transversely journaled in said mandrel and partially projecting above the upper face thereof to form anti-friction bearing points for a blank during its forming operation, said rollers being engaged or driven by said belt when passing through said slot, and a pair of flanged spaced pulleys journaled on the rear end of said mandrel for guiding said belt.

17. In a forming mechanism, the combination with a belt conveyor, of a stationary mandrel rectangular in cross-section, a series of rollers transversely journaled in recesses formed in the underside of said mandrel for forming anti-friction bearing for said belt while traveling under said mandrel, a roller journaled in the forward end of said mandrel over which said belt operates, said mandrel being provided with a longitudinally disposed slot through which said belt operates during its return movement, a series of rollers transversely journaled in said mandrel and partially projecting above the upper face thereof to form anti-friction bearing points for the blank during its forming operation, said rollers being engaged or driven by said belt when passing through said slot, a pair of flanged spaced pulleys journaled on the rear end of said mandrel for guiding said belt, a shaft disposed above and rearwardly of the rear end of said mandrel, a pulley fixed to said shaft and operatively engaging said belt, and means for actuating said shaft.

18. In a forming mechanism, the combination with a belt conveyor, of a stationary mandrel rectangular in cross-section, a series of rollers transversely journaled in recesses formed in the underside of said mandrel for forming anti-friction bearing for said belt while traveling under said mandrel, a roller journaled in the forward end of said mandrel being provided with a longitudinally disposed slot through which said belt operates during its return movement, a series of rollers transversely journaled in said mandrel and partially projecting above the upper face thereof to form anti-friction bearing points for a blank during its forming operation, said rollers being engaged or driven by said belt when passing through said slot, a pair of flanged spaced pulleys journaled on the rear end of said mandrel for guiding said belt, a belt conveyor operating below said first belt and said mandrel and in cooperative relation therewith, a series of rollers transversely disposed under the co-acting portions of said belts for maintaining said portions in blank-engaging relation and in cooperative relation with said mandrel, a pulley stationarily mounted below the forward end of said mandrel for returning said second belt rearwardly, a shaft disposed rearwardly of and below the rearward end of said mandrel, a pulley fixed to said shaft and operatively engaging said last-mentioned belt, and means for driving said shafts and operating said belts at uniform speeds.

19. In a forming mechanism, the combination with a belt conveyor, of a stationary mandrel rectangular in cross-section, a series of rollers transversely journaled in recesses formed in the underside of said mandrel for forming anti-friction bearing for said belt while traveling under said mandrel, a roller journaled in the forward end of said mandrel being provided with a longitudinally disposed slot through which said belt operates during its return movement, a series of rollers transversely journaled in said mandrel and partially projecting above the upper face thereof to form anti-friction bearing points for a blank during its forming operation, said rollers being engaged or driven by said belt when passing through said slot, a pair of flanged spaced pulleys journaled on the rear end of said mandrel for guiding said belt, a belt conveyor operating below said first belt and said mandrel and in cooperative relation therewith, a series of rollers transversely disposed under the co-acting portions of said belts for maintaining said portions in blank-engaging relation and in cooperative relation with said mandrel, a pulley stationarily mounted below the forward end of said mandrel for returning said second belt rearwardly, a shaft disposed rearwardly of and below the rearward end of said mandrel, a pulley fixed to said shaft and operatively engaging said last-mentioned belt, means for driving said shafts and operating said belts at uniform speeds, and adjustable means for adjusting the tension of said belts independently of each other.

20. In a forming mechanism, the combination with a belt conveyor, of a stationary mandrel rectangular in cross-section, a series of rollers transversely journaled in recesses formed in the underside of said mandrel, for forming anti-friction bearing for said belt while traveling under said mandrel, a roller journaled in the forward end of said mandrel being provided with a longitudinally disposed slot through which said belt operates during its return movement, a series of rollers transversely journaled in said mandrel and partially projecting above the upper face thereof to form anti-friction bearing points for a blank during its forming operation, said rollers being engaged or driven by said belt when passing through said slot, a pair of flanged spaced pulleys journaled on the rear end of said mandrel for guiding said belt, a belt conveyor operating below said first belt and said mandrel and in cooperative relation therewith, a series of rollers transversely disposed under the co-acting portions of said belts for maintaining said portions in blank-engaging relation and in cooperative relation with said mandrel, resilient supports for said last-mentioned rollers for yieldingly maintaining the latter in belt engaging positions, a pulley stationarily mounted below the forward end of said mandrel for returning said second belt rearwardly, a shaft disposed rearwardly of and below the rearward end of said mandrel, a pulley fixed to said shaft and operatively engaging said last-mentioned belt, and means for driving said shafts and operating said belts at uniform speeds.

21. In a slide box shell machine, the combination of a feeding means for feeding a strip of pasteboard material, cooperating scoring and trimming elements for operating on said strip, means for applying a covering strip, the width of said covering strip being greater than the width of said pasteboard strip whereby one edge of said covering strip extends beyond the edge of said pasteboard strip to said pasteboard strip, means for severing the composite strip transversely into blanks of suitable sizes, a stationary elongated mandrel rectangular in cross section, means for carrying each blank adjacent to and in a plane co-extensive with the length of said mandrel; forming mechanism for folding said blank over said mandrel to form slide box shells, said mechanism including means for first bending the projecting portions of the blank against the sides of the mandrel and other means for folding the top portion of the blank over the top of said mandrel; and means for lapping glue projecting edge of a covering strip over the opposite edge of said blank.

22. In a box machine, the combination of a feeding means for feeding a strip of pasteboard material, cooperating scoring and trimming elements for operating on said strip, cooperating rolls for engaging said strip of pasteboard after scoring and trimming operation and applying thereto a covering strip one side edge of said covering strip extending beyond the corresponding edge of said pasteboard strip, a series of blades disposed longitudinally on the periphery of said rolls in cooperative relation with each other for severing the composite strip transversely into blanks of suitable sizes, and a gravity actuated guide for maintaining said covering strip in proper tensioned condition.

23. In a box machine, the combination of a feeding means for feeding a strip of pasteboard material, cooperating scoring and trimming elements for operating on said strip, means for applying a covering strip one edge of said covering strip being extended beyond the corresponding edge of said pasteboard strip to said pasteboard strip, means for severing the composite strip transversely into blanks of suitable sizes, and forming mechanism for receiving said blanks and forming them into slide box shells and gluing the projecting edge of said covering strip to the opposite edge of the folded blank.

24. In a machine of the class described, a pair of cooperating rolls adapted to receive a strip of material and apply to one face thereof a strip of covering material, and blades longitudinally disposed in each roll and having their cutting edges in overlapping relation with each other for severing the composite strips transversely into blanks, said blades being spaced circumferentially on said rolls for forming blanks of the desired sizes, and means for adjustably and yieldingly mounting one of said rolls in cooperative relation with the other roll.

25. In a machine of the class described, the combination with a blanking mechanism, of an elongated stationary mandrel a pair of cooperating endless conveyors for moving a blank in cooperative relation with the underside of said mandrel, a pair of belt conveyors for engaging said blank and folding portions thereof against the sides of said mandrel, means for folding the remaining portion of the blank over the top of said mandrel, and a flat belt disposed at an angle to the line of travel of said blank for lapping the projecting edge of the glue strip over the folded top portion of said blank thereby securing the latter in slide box shell form.

26. In a machine of the class described, a forming mechanism comprising in combination an elongated stationary mandrel, a pair of cooperating belts for engaging a blank and moving it forwardly in cooperative relation with the underside of said mandrel, a pair of belt conveyors for engaging said blank and folding portions thereof against the sides of said mandrel, means for folding the remaining portion of the blank over the top of said mandrel, a flat belt disposed at an angle to the line of travel of said blank for lapping the projecting edge of the glue strip over the folded portion of said blank thereby securing the latter in slide box shell form, and means for mounting said belts and said folding means under yielding pressure against said mandrel.

27. In a forming mechanism, a stationary elongated mandrel, an endless conveyor operating adjacent to one face thereof for moving suitable blanks in close relation with said mandrel, rollers disposed in said mandrel and extending beyond the plane of forming antifriction bearings for each blank, said rollers being positively driven in appropriate direction to feed the blank forward, and forming elements disposed adjacent to and longitudinally of said mandrel for engaging each blank and forming it over said mandrel during its movement forwardly thereof.

28. In a forming mechanism, a stationary elongated mandrel, an endless conveyor operating adjacent thereof for moving suitable blanks in close relation with the underside thereof, means disposed in the underside of said mandrel for cooperating with said conveyor in moving said blanks forward, driven rollers disposed in the upper face of said mandrel adapted to be egaged by portions of said blanks, thereby assisting in moving said blanks forward, and forming elements disposed adjacent to said mandrel for engaging and forming each blank.

29. In a forming mechanism, a stationary elongated mandrel, an endless conveyor operating adjacent to the underside of said mandrel adapted to receive blanks and move them forward, driven means disposed in the underside of said mandrel and adapted to engage said blanks in cooperation with said endless conveyor and move them in definite relation to said mandrel, and rollers arranged in said mandrel and projecting outwardly therefrom for providing anti-friction points of engagement between each blank and said mandrel.

30. In a forming mechanism, a stationary elongated mandrel provided with a longitudinally disposed slot, a series of spaced rollers transversely disposed in said mandrel and projecting beyond the lower face thereof, an endless conveyor operating forwardly over said rollers and returning rearwardly through said slot, and a series of rollers arranged in said mandrel above said slot and driven by said conveyor, the last-mentioned rollers projecting past the upper face of said mandrel for providing driving points of engagement for that portion of the blank which is formed over the upper face of said mandrel.

In testimony whereof I hereunto affix my signature this 6th day of August, 1925.

ORPH W. COWGILL.